May 25, 1965
J. M. EITEL
3,185,444
METHOD OF INSTALLING CABLE ON EXISTING MESSENGER
Filed May 15, 1964
3 Sheets-Sheet 3
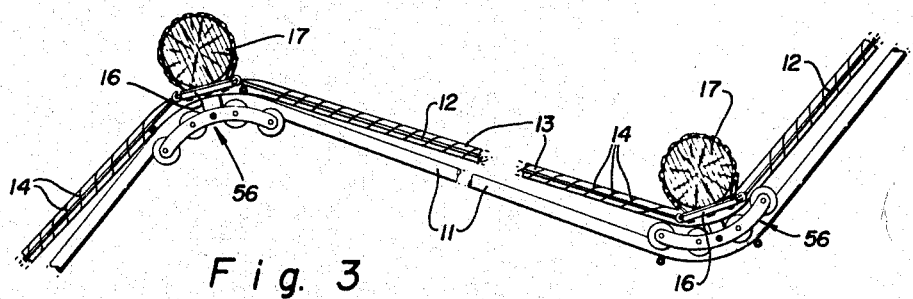
Fig. 3
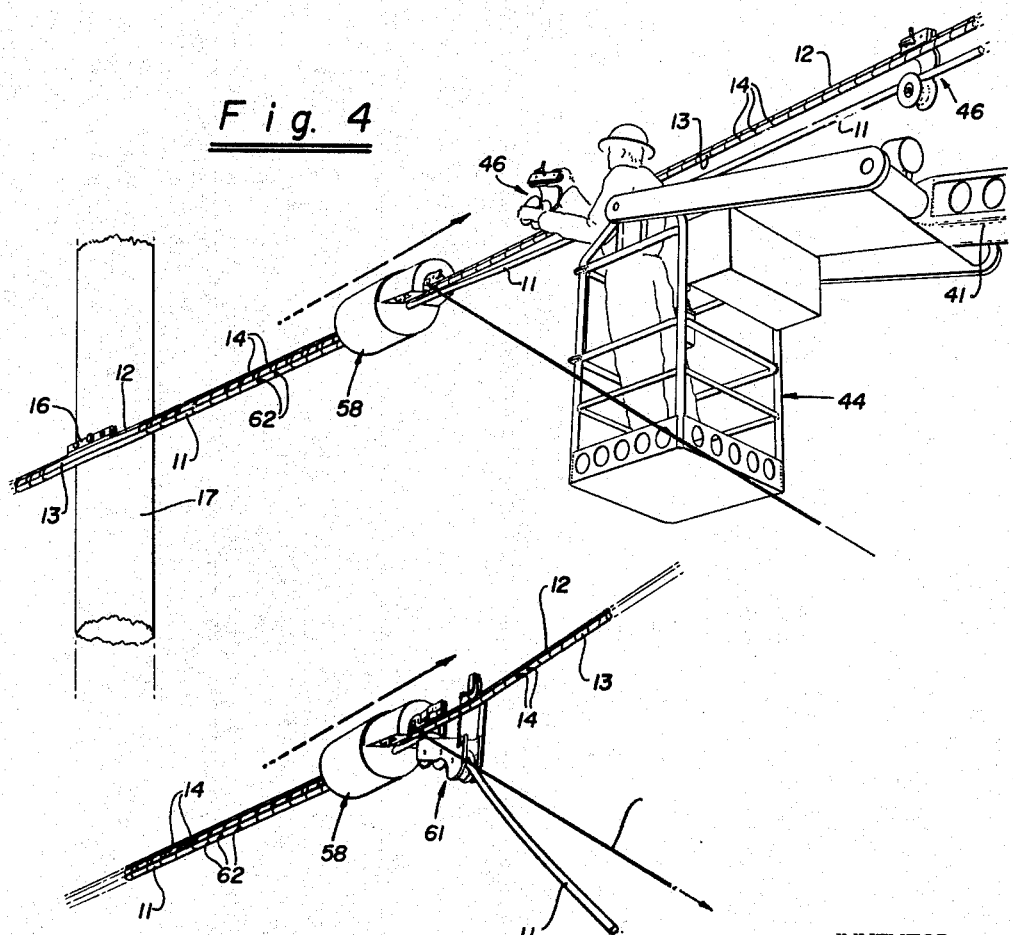
Fig. 4
Fig. 5
INVENTOR.
Jay M. Eitel
BY
Attorneys

United States Patent Office 3,185,444
Patented May 25, 1965

3,185,444
METHOD OF INSTALLING CABLE ON EXISTING MESSENGER
Jay M. Eitel, Los Altos, Calif., assignor to Telsta Corporation, San Carlos, Calif., a corporation of California
Filed May 15, 1964, Ser. No. 367,818
3 Claims. (Cl. 254—134.3)

This application is a continuation-in-part of application Serial No. 166,035, filed January 15, 1962, now abandoned.

This invention relates to a method for installing cable on an existing messenger on the field side or on the road where the messenger passes through trees, and also to a method of installing additional cable on an existing messenger with one or more cables already lashed to the messenger.

At the present time, there is a great need for reinforcing existing cable plants. This need has been brought about by the continuous development of new subdivisions which require telephone service. Very often existing cables are loaded to capacity and, therefore, there is a need for installing additional cables. In many cases, existing pole lines are already crowded because they may have as many as four or five cables mounted on it with each of the cables being placed on a separate messenger or strand. The supporting messengers or strands must be spaced a certain minimum distance apart as, for example, 12 inches and there also must be adequate clearance below the cables to permit the passage of vehicles and trucks on roads over which the cables pass. For these and other reasons, it is often undesirable and impossible to place another messenger with a separate cable on the pole line. As is well known to those skilled in the art, most of the existing cable is encased in a lead sheath. Recently, a cable has been developed which has a plastic outer sheath which is many times lighter than the lead cables heretofore utilized. The advent of the plastic sheath cable has made it possible to install additional cables on existing messengers because the existing messengers have a sufficient safety factor so that a second and sometimes even third or fourth plastic cables can be installed on the same messenger. There is a need for an improved method for the installation of such additional cables on a messenger. Also, there is a need for an improved method for installation of new cable on new messenger on the field side of the poles and the installation of new cable on new messenger on the road side of the poles when the new messenger passes through trees.

In general, it is an object of the present invention to provide a method of installing additional cables on existing messenger to which one or more cables have already been lashed.

Another object of the invention is to provide a method of the above character in which the additional cables can be installed without removing the lashing previously utilized for lashing the existing cable to the messenger.

Another object of the invention is to provide a method of the above character in which the cable can be immediately lashed in place as it is guided into a position substantially horizontal to the messenger by a cable guide.

Another object of the invention is to provide a method of the above character which is particularly adapted to the use of a workman's lift mounted on a boom structure carried by a motorized vehicle and in which the cable is towed by the vehicle and the workman's lift is freely operable by the workman on the lift while the cable is being towed.

Another object of the invention is to provide a method of the above character which is particularly useful in installing the cable where objects are in the path of the existing cable and wherein there are corners or bends in the existing cable lines.

Another object of the invention is to provide a method which is particularly useful for the placement of new cable on new messenger on the field side of the poles or on the roadside of the poles where the messenger passes through trees.

Another object of the invention is to provide a method of the above character which utilizes a minimum of personnel.

Another object of the invention is to provide a method of the above character which facilitates the rapid installation of additional cable.

Another object of the invention is to provide a method of the above character which greatly reduces the equipment required.

Additional objects and features of the invention will appear from the following description in which the preferred embodiments are set forth in detail in conjunction with the accompanying drawings.

Referring to the drawings:

FIGURE 3 is a plan view illustrating my method for pulling the cable around corners.

FIGURE 4 is a perspective view showing my method for lashing the additional cable to the existing cable after it has been put in position.

FIGURE 5 illustrates my method of direct lashing an additional cable to the existing messenger.

In general, my method for installing additional cables on an existing messenger with one or more cables already lashed to the messenger is performed by positioning the additional cable so that it lies adjacent the messenger in a plane substantially parallel to the messenger and then lashing the additional cable to the messenger by lashing over the cable and the lashing already in place. The lashing can be accomplished directly at the same time that the cable is being positioned, or it can be accomplished indirectly after the cable has been placed in a position parallel to the messenger.

Figure 1:
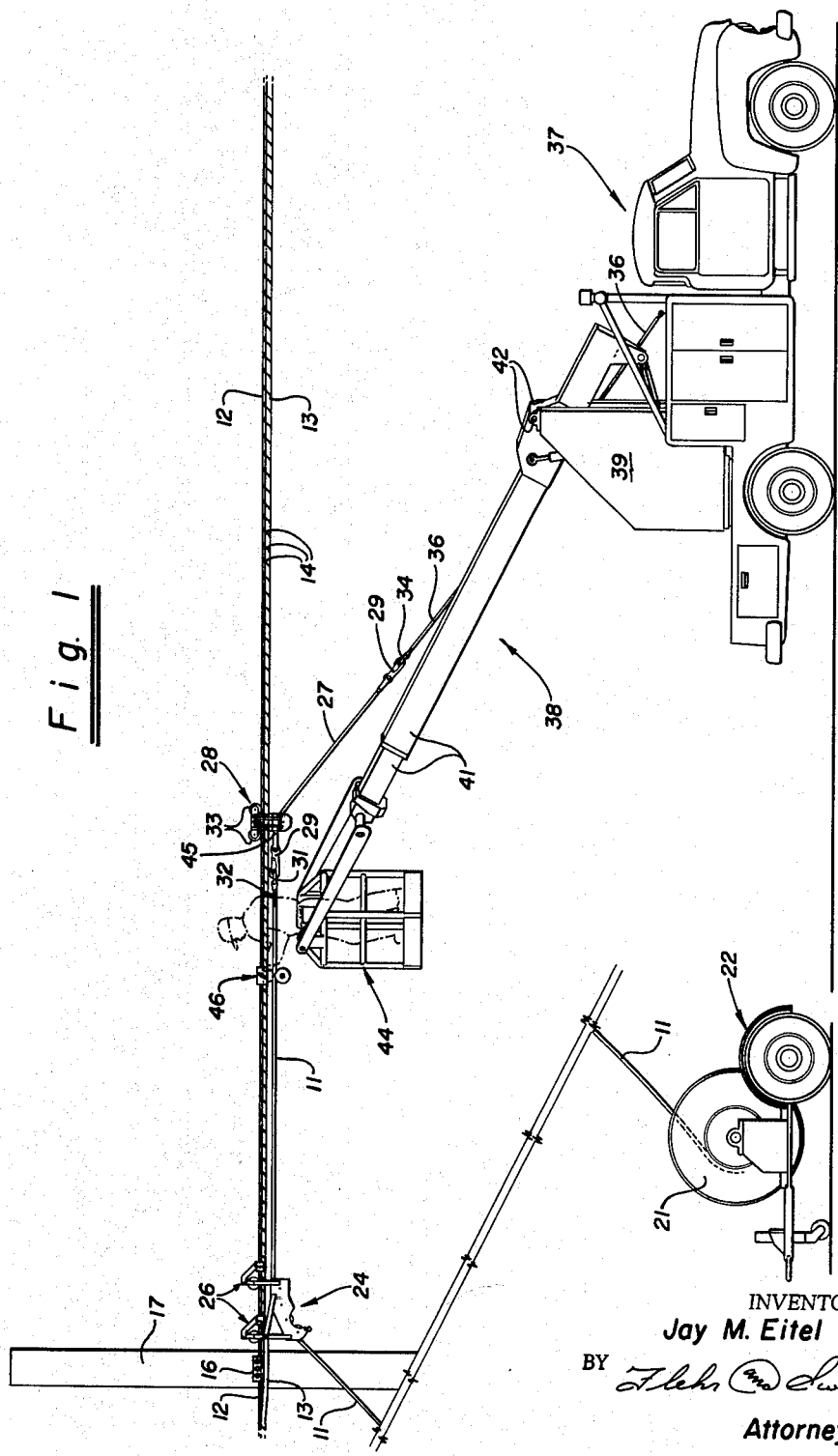
FIGURE 1 is a side elevational view illustrating my method using indirect lashing.

As shown in FIGURE 1, my method is used for installing an additional cable 11 upon an existing messenger or strand 12 on which one or more cables 13 have been lashed to the messenger or strand by suitable means such as the lashing 14. The messenger 12 is supported in a suitable manner such as by clamps 16 mounted on support members or poles 17. One conventional way of installing such a cable consists of placing a messenger under tension on the support members or poles 17 and fastening the messenger to the support members or poles 17 by the clamps 16. Thereafter, at least one cable is positioned so that it lies substantially parallel and in relatively close proximity to the messenger. A lashing machine travelling on the messenger is then used to lash the cable to the messenger with the use of lashing wire 14 so that the cable lies adjacent the messenger and is supported by the messenger as shown in FIGURE 1 of the drawings.

The cable 11 which is to be installed is carried in a conventional manner such as upon a reel or drum 21 which is rotatably mounted upon a trailer 22 of conventional construction. Let it be assumed that it is desired to install this additional cable 11 on an existing messenger 12 which passes through certain obstructions such as trees. The trailer 22 is positioned so that it is approximately one hundred feet short of the pole on which the inner end of the cable and the reel is to be mounted. A cable guide 24 of the type described in my copending application Serial No. 166,304, filed January 15, 1962, is mounted upon the messenger or strand 12 at a position ahead of the trailer and at which it is desired to start the cable 11 and is affixed thereto by clamps 26. The end of the cable 11 is then passed through the roller type cable guide 24. The end of the cable 11 is then connected to one end of a cable tow rope or member 27 which forms a part of the cable tow dolly 28 of the type described in my copending application Serial No 166,247, filed Jan. 15, 1962. As described in my copending application, both ends of the cable tow member 27 are provided with snaps 29. One of the snaps 29 engages a ring 31 which forms a part of a basketweave type connector or grip 32 which is secured to the end of the cable. The cable tow dolly is also mounted upon the messenger 12 and is provided with rollers or pulleys 33 so that the dolly can be towed on the messenger or cable. The other hook or snap 29 is connected to a ring 34 which is fastened to a tow rope 36. The tow rope 36 is pulled in a suitable manner such as by the motorized vehicle 37 shown in the drawings.

The vehicle 37 carries a workman's lift 38 of the type described in my Patent No. 2,896,750 and includes a lift supporting structure 39 which is mounted upon the vehicle 37 for rotational movement about a vertical axis and an extensible boom structure 41 which can be raised and lowered about a horizontal axis 42. A workman's basket or platform 44 is carried by the outer end of the boom structure and is provided with a control switch (not shown) of a type described in my Patent No. 2,841,659 by which the workman in the basket 44 can control his position. That is, by operation of the control switch, the workman can extend and retract the boom structure, raise and lower the boom structure about the horizontal axis 42, and rotate the lift supporting structure 39 about a vertical axis.

From the construction of the lift supporting equipment 38, it can be seen that the workman in the workman's basket can readily position the cable guide 24 and the cable tow dolly 28 upon the messenger 12 and connect the cable to the dolly 28 as described. After this has been accomplished, the workman in the workman's platform 44 instructs the driver of the vehicle to advance the vehicle to pull the cable tow member 27. As described in my copending application Serial No. 166,247, filed Jan. 15, 1962, the cable tow member is provided with a stop 45 which engages the dolly and pulls the dolly along with the cable. As the cable 11 is towed, the cable is unreeled from the cable drum 21. The cable guide 24 serves to position the cable after it passes from the drum 21 so that it will lie in a position substantially parallel and spaced below the messenger 12.

The workman positions the platform or lift 44 so that it is only slightly behind the cable tow dolly 28 as shown in FIGURE 1. After the cable is postioned parallel to the messenger 12 by the cable tow dolly 28, it is thereafter held in a predetermined spaced relationship with respect to the messenger 12 by a plurality of cable blocks 46 which are sequentially placed on the messenger 12 after the cable has been pulled past the location at which the cable is to be supported by the operator in the workman's basket at suitable intervals so that the cable 11 will be supported by the messenger 12 without undue sagging. The spacing between the blocks varies in accordance with the weight of the cable. The placing of the cable blocks can be accomplished while the vehicle or truck 37 is in motion because the operator can control the positioning of the workman's basket 44 with one hand while utilizing the other hand to place the cable blocks 46.

It should be noted that the cable guide 24 and the cable tow dolly 28 as well as the cable blocks 46 are constructed in such a manner that they can readily accommodate the cables 13 which are already lashed to the messenger 12 while still performing the function of supporting the additional cable 11.

Figure 2:
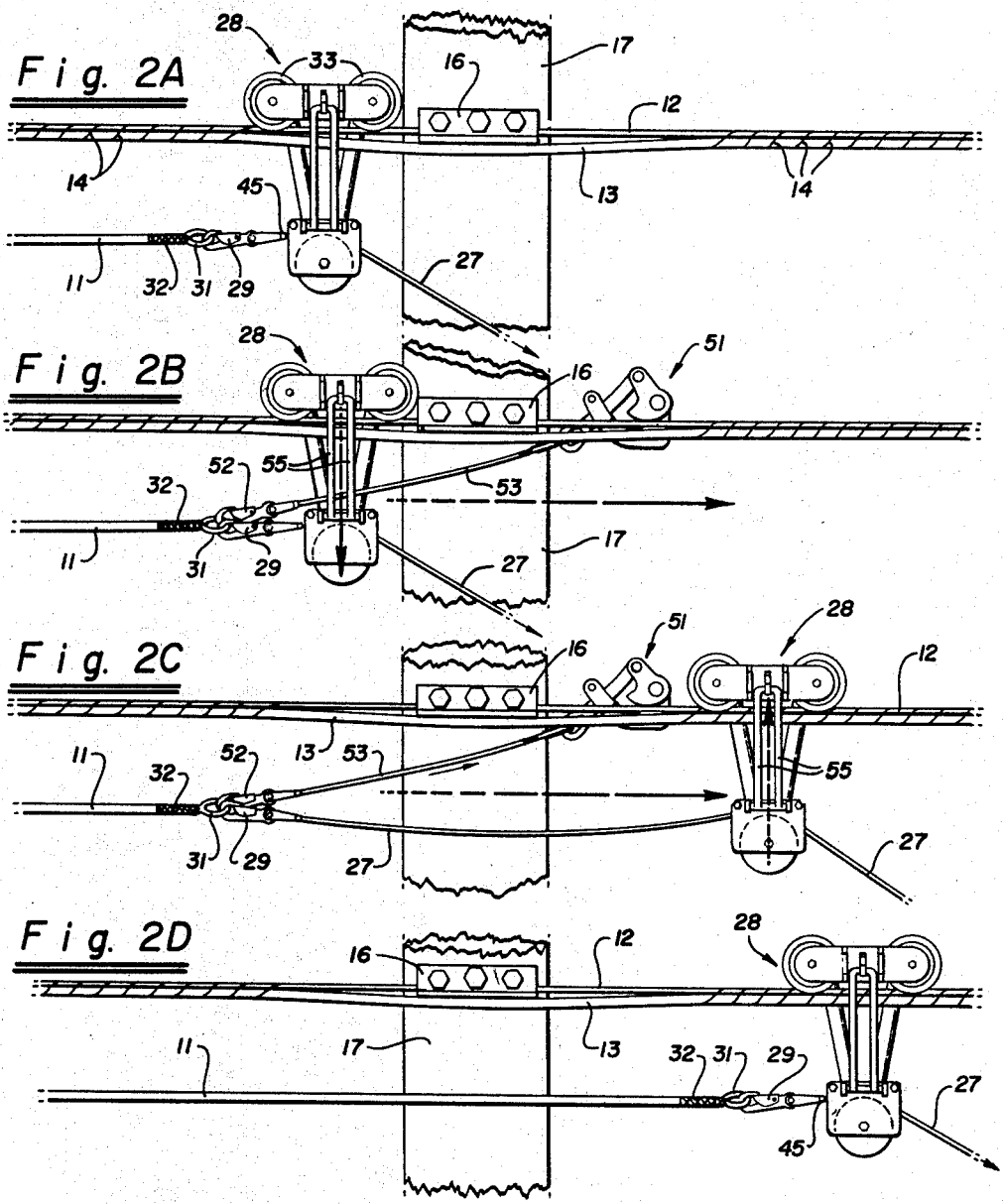
FIGURES 2A, 2B, 2C and 2D are side elevational views illustrating my method for pulling the cable around an object or obstruction.

Now let it be assumed that the cable tow dolly 28 arrives at an obstruction such as a pole 17 as shown in FIGURE 2A. The truck 37 is stopped so that the cable tow dolly 28 is stopped short of the pole and preferably so that it does not strike the pole. The operator in the workman's basket 44 then positions the basket alongside the cable tow dolly 28 and takes a strand grip 51, sometimes called a "come-along," and secures it to the messenger as shown. The "come-along" 51 is provided with a snap 52 which is snapped into the ring 31. The "come-along" 51 is normally positioned so that the connecting rope or member 53 is not too loose. Thereafter, the operator of the vehicle releases the tension on the cable tow member 27 in a suitable manner such as by backing up the truck. The cable grip 51 retains the end of the cable 11 in position and frees the cable tow dolly 28 so that it can be moved around the pole. Alternatively, if desired, in place of the "come-along" 51, an electrically operated winch can be used which is secured to the messenger 12 and the connecting rope. The winch would be supplied with power from the workman's basket 44 and would be provided with controls so that it could be operated either from the workman's basket or the vehicle. The cable tow dolly could then be freed by operating the winch instead of backing up the truck. After the dolly is freed, it is lifted off of the messenger 12, and then lifted around the pole 17 by sliding it on the tow member 27 and then placed on the messenger 12 on the other side of the pole as shown in FIGURE 2C.

As explained in my copending application, the cable tow dolly is removed from the messenger and placed on the messenger 12 by opening and closing a gate 55. The vehicle or truck 37 then moves ahead slightly to again tension the cable tow member 27 and to loosen the rope 53 so that the clamp 51 can be removed. If a winch is used as hereinbefore described, it can also be removed after tension has been applied to the cable tow member 27. After the clamp 51 has been removed, the cable 11 is then towed again and positioned below the messenger 12 in the manner hereinbefore described. The cable tow dolly travels with the end of the cable as soon as the end of the cable reaches the cable tow dolly as shown in FIGURE 2D.

Now let it be assumed that it is desired to go around a corner as shown in FIGURE 3. First, we have an outside corner in which the pole is on the outside of the angle formed by the messenger as shown in the left-hand side of FIGURE 3. Upon arriving at the pole 17, an around-the-corner cable guide of the type described in my copending application Serial No. 166,036, filed Jan. 15, 1962 is mounted upon the pole so as to support the cable at a predetermined position with respect to the messenger 12. The cable tow dolly 28 is again lifted off of the messenger 12 and transferred around the corner cable guide 56 as explained in my copending application Serial No. 166,036, filed Jan. 15, 1962. The cable 11 is placed in the corner cable guide 56 so that the cable 11 engages the rollers as shown by advancing the vehicle 37 to pull the tow member 27 and the cable 11 through and around the corner cable guide. The cable stringing operation can then progress in the same manner as hereinbefore described. The around-the-corner roller assembly or guide 56 serves to reduce friction to a minimum and permits pulling of long lengths of cable without endangering the cable.

Another corner in the pole line is shown in the right-hand side of FIGURE 3 and is what can be called an inside corner in which the pole is mounted inside the angle defined by the messenger 12. The cable tow dolly 28 is moved around the around-the-corner roller assembly 56 in a manner similar to that hereinbefore described and the cable is pulled through the around-the-corner roller assembly 56 and positioned adjacent the messenger or strand 12 in a manner similar to that hereinbefore described. Again, the around-the-corner cable assemblies or guides are constructed in such a manner that they can readily accommodate one or more existing cables already lashed to an existing messenger. The around-the-corner cable assemblies prevent the cable from dragging on the surface of the poles 17 and thereby prevent permanent injury to the cable.

The cable 11 can be pulled through trees or other obstacles in a manner similar to that described for pulling the cable past poles. It is merely necessary to move the cable tow dolly around branches or groups of branches in passing through the trees. Thus, it can be seen that my method is particularly useful for placing new cable on new messenger on the fieldside of poles or on the roadside of poles where the messenger or strand passes through trees.

The cable 11 is only positioned in the manner hereinbefore described when it is necessary to pull the cable past poles and through obstacles or obstructions such as trees for fieldside placement or through trees for roadside placement. Normally, the cable is pulled through the shortest distance and then is dead-ended. After the cable is held in the proper position by cable block 46, a lasher of the type described in my copending application Serial No. 166,248, filed January 15, 1962 is mounted on the messenger 12 and is towed by the vehicle or truck 37 to lash the cable to the messenger for a new installation or to lash the additional cable to the messenger for an existing installation. This lashing in an existing installation is accomplished by lashing over existing lashing already in place for securing the existing cable or cables to the messenger. No attempt is made to remove the existing lashing because of the effort required so that, in effect, some of the cables become double-lashed or triple-lashed to the messenger depending upon how many cables are supported by the messenger 12.

As shown in FIGURE 4, the cable blocks 46 are removed by the workman in the workman's basket as the lashing operation is performed. If desired, they can be taken off as the lasher reaches the cable block or a group of cable blocks can be pushed to a pole and then all removed at the same time.

Now assuming that the remainder of the messenger is clear for roadside placement, that is, there are no large obstacles in the path, the trailer 22 is connected to the vehicle 37. The cable guide 24 is removed and a cable guide 61 is mounted on the lasher as described in my copending application Serial No. 166,248, filed January 15, 1962. Now, as the vehicle advances, the cable is guided into a position parallel to the messenger 12 by the cable guide 61 and immediately thereafter, the cable 11 is lashed into place by the lasher 58 by lashing over the existing cables and lashing. This operation continues until the end of the line is reached. The operator in the workman's basket can again readily observe the operation of the lasher and the cable guide and can move the basket at all times because the cable is being towed by the vehicle and not by the boom or workman's basket. These latter steps cannot be used for fieldside placement because of the presence of poles.

With the foregoing method, it can be seen that an attendant is not required at the cable trailer 22. The cable trailer is positioned short of the pole as hereinbefore described when it is desired to pull the entire length of cable in one direction and then lock on the return. When such is the case, it is undesirable to pull all of the cable from the reel because undue slack would occur in the cable. Rather, it is preferable to position the trailer so that some cable, e.g. 100 feet, will remain on the cable reel and then lock up to the trailer. The remaining cable can then be unreeled and locked into place.

It is apparent from the foregoing that I have provided a method for the installation of additional cables on messenger which already has cables lashed to it. As described, this additional cable or cables can be put in place without removing the lashing on the cables already in place. Also, my method can be used for new installataions where fieldside placement is required or where roadside placement can be used, but the cable and messenger must pass through trees.

I claim:

1. In a method for installing a cable on existing messenger, placing a cable guide upon the messenger and affixing it to the messenger so that it cannot move, placing a cable tow dolly having a tow member slidably mounted therein upon the messenger, passing the cable through the cable guide affixed to the messenger and attaching it to one end of the tow member, towing the other end of the tow member to pull the cable through the cable guide and to pull along with it the cable tow dolly, the cable guide and the cable tow dolly serving to position the cable in a position substantially parallel to and spaced below the messenger, placing cable blocks on the messenger at spaced intervals as the cable is being positioned to temporarily support the cable after the cable has passed the locations at which it is to be supported, and continuing the same sequence of steps until a substantial length of cable is positioned, placing a lasher upon the messenger, lashing the cable to the messenger, and removing the cable blocks as the lashing progresses.

2. A method as in claim 1 wherein the cable is strong through or around an obstruction, including the steps of advancing the cable dolly up to the obstruction, securing the end of the cable to the messenger, releasing the tension on the tow member, lifting the cable dolly from the messenger around the obstruction by shifting it on the tow member and placing it on the messenger on the other side of the obstruction, towing the tow member, releasing the cable from the messenger, and continuing towing of the tow member to tow the cable and the cable tow dolly.

3. A method as in claim 1 wherein the cable passes around a corner including the steps of advancing the cable tow dolly to the corner, placing an around-the-corner cable guide on the messenger, securing the cable to the messenger, releasing the tension on the cable tow member, lifting the cable tow dolly around-the-corner cable guide and placing it on the messenger, placing the cable tow member in the around-the-corner cable guide, taking up the slack in the tow member, releasing the cable from the messenger, and continuing towing of the tow member to tow the cable through the around-the-corner cable guide.

References Cited by the Examiner
UNITED STATES PATENTS

| | | |
|---|---|---|
| 2,277,935 | 3/42 | Perkins. |
| 2,479,635 | 8/49 | Neale. |
| 2,592,943 | 4/52 | Neale. |
| 2,668,668 | 2/54 | Stanford. |
| 2,983,037 | 5/61 | Hendrix. |
| 3,110,480 | 11/63 | Eitel _____ 254—134.3 |

OTHER REFERENCES

Electrical World (publication), pages 69–72, Apr. 24, 1948.

WILLIAM FELDMAN, Primary Examiner.

MILTON S. MEHR, Examiner.